United States Patent [19]
Dennis

[11] Patent Number: 5,513,441
[45] Date of Patent: May 7, 1996

[54] ADAPTER FOR FACILITATING MEASUREMENTS OF VEHICLE DRIVE TRAIN COMPONENTS

[75] Inventor: David A. Dennis, Maumee, Ohio

[73] Assignee: Dana Corporation, Toledo, Ohio

[21] Appl. No.: 359,886

[22] Filed: Dec. 20, 1994

[51] Int. Cl.$^6$ .................. G01C 9/00; G01C 9/28
[52] U.S. Cl. ............................ 33/370; 33/600
[58] Field of Search ................. 33/365, 370, 371, 33/517, 534, 567, 600, 606, 645; 73/118.1, 119 R, 866.5

[56] References Cited

U.S. PATENT DOCUMENTS

| | | | |
|---|---|---|---|
| 1,068,983 | 7/1913 | Coulthurst | 33/533 |
| 1,124,984 | 1/1915 | White | 33/399 |
| 2,827,710 | 3/1958 | Campbell | 33/600 |
| 2,968,873 | 1/1961 | Holderer | 33/371 |
| 3,438,135 | 4/1969 | Bense | 33/600 |
| 4,434,558 | 3/1984 | Face, Jr. et al. | 33/533 |
| 4,480,390 | 11/1984 | Frissora et al. | 33/371 |
| 4,790,079 | 12/1988 | Meyers | 33/533 |
| 4,794,701 | 1/1989 | Clark | 33/370 |
| 4,888,875 | 12/1989 | Strother | 33/371 |
| 5,033,292 | 7/1991 | Dennis | 73/118.1 |

OTHER PUBLICATIONS

Henry J. Miehle, "Shopmade Level Aligns Radial Holes", Popular Science, p. 177, Nov., 1945.

Primary Examiner—William A. Cuchlinski, Jr.
Assistant Examiner—G. Bradley Bennett
Attorney, Agent, or Firm—MacMillan, Sobanski & Todd

[57] ABSTRACT

An adapter for facilitating the use of a device, such as an inclinometer, to measure the angular inclination of components in a vehicular drive train system is disclosed. The adapter includes a rectangular bracket having a flat upper surface and a lower surface. The bracket includes first and second legs extending from the lower surface and terminating in respective flat end surfaces. The end surfaces define a plane which is precisely parallel to the flat upper surface of the bracket. The inclinometer may be mounted in one of two different orientations on the flat upper surface of the bracket. The legs are spaced apart a predetermined distance to allow the end surfaces to engage flats machined on the surface of a full round end yoke of a universal joint without interference from the end flange portion of the bearing cap.

7 Claims, 2 Drawing Sheets

ADAPTER FOR FACILITATING MEASUREMENTS OF VEHICLE DRIVE TRAIN COMPONENTS

BACKGROUND OF THE INVENTION

This invention relates in general to devices for measuring the angular inclination of various components in a vehicular drive train system and in particular to an adapter for facilitating the use of such devices.

Vehicle drive train systems typically include a transmission having an output shaft connected through an elongated drive shaft to an input shaft of an axle assembly. Because of constraints imposed by the overall design of the vehicle, these shafts are rarely aligned such that their axes of rotation are co-axial. To accommodate this, and further to permit a small amount of relative movement to occur between the transmission and the axle assembly resulting from movement of the suspension system of the vehicle and flexing of the vehicle frame during use, universal joints are usually provided between the transmission output shaft and the forward end of the drive shaft and between the rearward end of the drive shaft and the axle assembly input shaft. The universal joints permit the axes of rotation of the adjacent shafts to be angularly disposed, while providing a rotational driving connection therebetween.

The angular relationships between the transmission output shaft, the drive shaft, and the axle assembly input shaft are important factors in the proper operation of the drive train system. If the axes between these components are too large, or if the angle between the transmission output shaft and the forward end of the drive shaft is not equal to the angle between the rearward end of the drive shaft and the axle assembly input shaft, torsional vibrations may be induced. Such vibrations can cause undesirable noise and, if not corrected, premature wear and failure of the components of the vehicle drive train system, including the transmission, the axle assembly, and the universal joints.

Accordingly, devices have been provided for measuring the angular disposition of these drive train components to determine the angular relationship therebetween. One such device is the Anglemaster® inclinometer sold by Dana Corporation, the assignee of this invention. When disposed in abutting relationship against a component of the drive train, the inclinometer measures the slope thereof relative to the horizontal. The angular disposition between two adjacent components in the drive train system can be determined by measuring the relative slopes of the individual components using the inclinometer. The difference between the two slope measurements constitutes the angular disposition between the two components.

Unfortunately, the drive train components are usually located beneath the vehicle in locations which are often partially obstructed by other portions of the vehicle. Furthermore, depending upon rotational orientation of the various drive train shafts when the vehicle is parked, access to the components against which the inclinometer must be placed may also be restricted by other portions of the vehicle. Thus, in order to facilitate the taking of the measurements, it is known to provide an adapter for use with the inclinometer. While known adapters have been useful in many situations, it has not been well suited for use in certain drive train assemblies, particularly those in which full round end yokes are used in the universal joints. Accordingly, it would be desirable to provide an improved adapter which is easily used on these types of drive train components.

SUMMARY OF THE INVENTION

This invention relates to an adapter for facilitating the use of a device, such as an inclinometer, for measuring the angular inclination of components in a vehicular drive train system. The adapter includes a flat rectangular bracket having a flat upper surface and a lower surface. The bracket includes first and second legs extending from the lower surface and terminating in respective flat end surfaces. The end surfaces define a plane which is precisely parallel to the flat upper surface of the bracket. The legs are spaced apart a predetermined distance to allow the end surfaces to engage flats machined on the outer surface of a full round end yoke of a universal joint without interference from the end flange portion of the bearing cap. The inclinometer may be mounted in one of two different orientations on the flat upper surface of the bracket.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
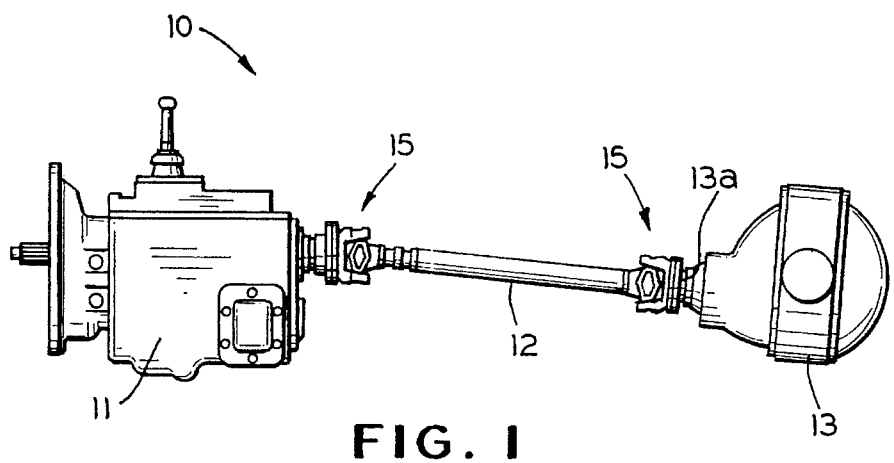
FIG. 1 is a side elevational view schematically illustrating a portion of a conventional vehicular drive train system.

Referring now to the drawings, there is illustrated in FIG. 1 a schematic view of a portion of a conventional vehicular drive train system, indicated generally at 10. The system 10 includes a transmission 11 which is connected through a drive shaft 12 to an axle assembly 13. As is typical in such a system 10, the output shaft (not shown) of the transmission 11 and the input shaft 13a of the axle assembly 13 are not co-axially aligned. Therefore, conventional universal joints, indicated generally at 15, are provided to rotatably connect the output shaft of the transmission 11 to the forward end of the drive shaft 12, and to rotatably connect the rearward end of the drive shaft 12 to the forward end of the axle assembly input shaft 13a.

Figure 2:
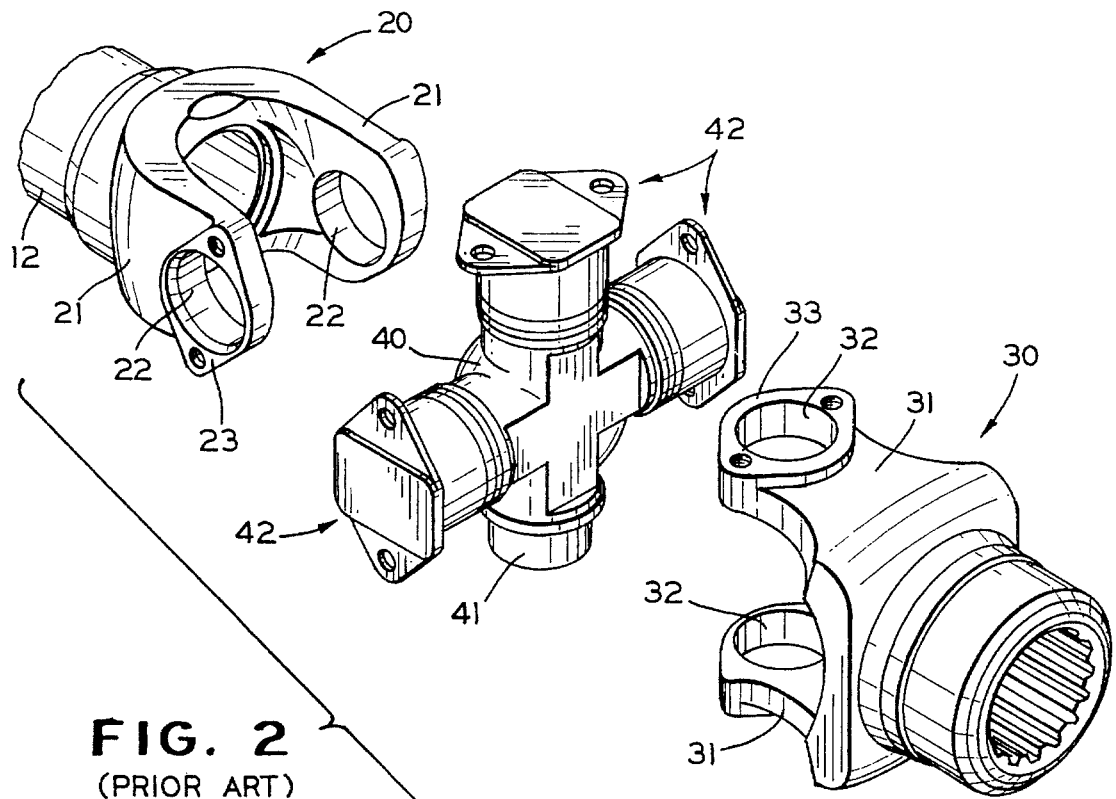
FIG. 2 is an exploded perspective view of a portion of one of the conventional universal joints used in the drive train system illustrated in FIG. 1.
Figure 3:
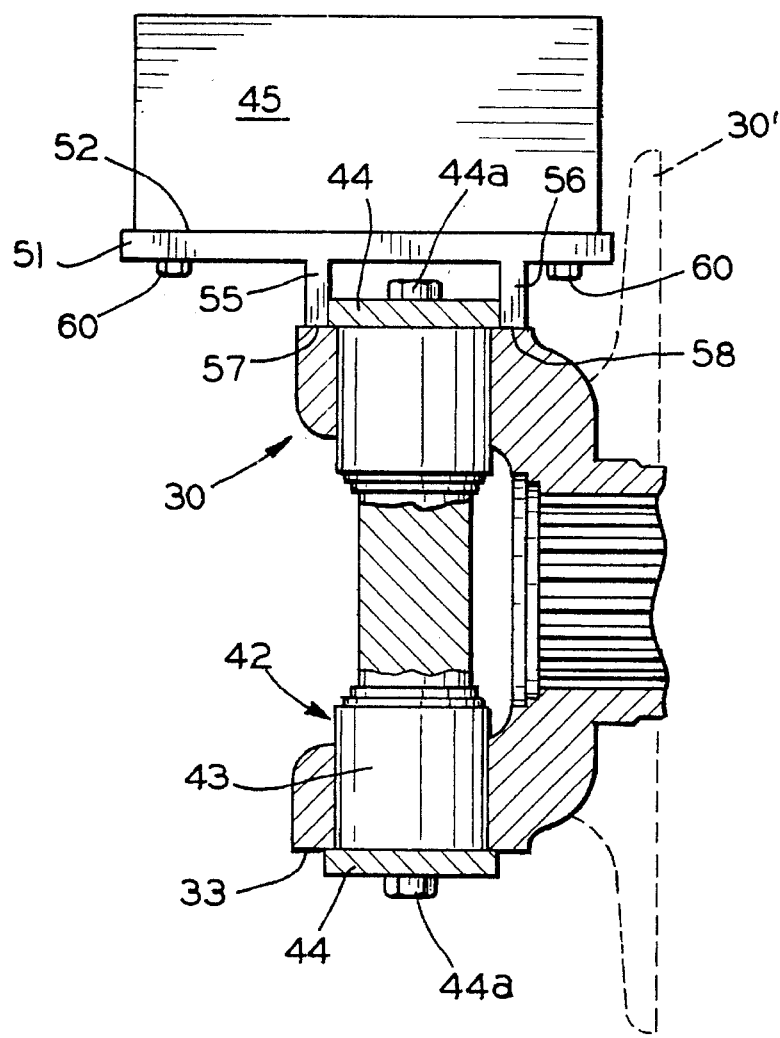
FIG. 3 is a sectional elevational view of the universal joint illustrated in FIG. 2 shown assembled in a full round end yoke and having an inclinometer mounted on an adapter in accordance with this invention.

The structure of the rearward universal joint 15 between the rearward end of the drive shaft 12 and the forward end of the axle assembly input shaft 13a is illustrated more clearly in FIGS. 2 and 3. Although this invention will be explained and illustrated in the context of this rearward universal joint 15, it will be appreciated that the invention can be used in a similar manner on the forward universal joint assembly 15 as well. As shown in FIGS. 2 and 3, the rearward end of the drive shaft 12 is connected to a conventional full round tube yoke, indicated generally at 20. The full round tube yoke 20 includes a pair of opposed yoke lugs 21 which extend in a common plane. A pair of co-axially aligned cross holes 22 are formed through the yoke lugs 21 of the full round tube yoke 20. The axis defined by the cross holes 22 extends generally perpendicular to the longitudinal axis of the drive shaft 12. A flat 23 is machined on each of the outer surfaces of the two lugs 21, extending about the cross holes 22. Each of the flats 23 defines a plane which is generally perpendicular to the axis defined by the cross holes 22 and which is generally parallel to the longitudinal axis of the drive shaft 12.

Similarly, the forward end of the axle assembly input shaft 13*a* is connected to a conventional full round end yoke, indicated generally at 30. The full round end yoke 30 includes a pair of opposed yoke lugs 31 which extend in a common plane. A pair of co-axially aligned cross holes 32 are formed through the yoke lugs 31 of the full round end yoke 30. The axis defined by the cross holes 32 extends generally perpendicular to the longitudinal axis of the axle assembly input shaft 13*a*. A flat 33 is machined on each of the outer surfaces of the two lugs 31, extending about the cross holes 32. Each of the flats 33 defines a plane which is generally perpendicular to the axis defined by the cross holes 32 and which is generally parallel to the longitudinal axis of the axle assembly input shaft 13*a*.

A conventional universal joint cross 40 is provided for connecting the full round tube yoke 20 on the drive shaft 12 with the full round end yoke 30 on the axle assembly input shaft 13*a*. The cross 40 is formed having four outwardly extending trunnions 41. The trunnions 41 extend in a common plane at right angles to one another. A bearing cap, indicated generally at 42, is rotatably mounted on the end of the each of the trunnions 41 for relative rotation by needle bearings (not shown) or similar means. Each of the bearing caps 42 includes a body portion 43 which is generally hollow and cylindrical in shape and which is adapted to fit over the end of one of the trunnions 41. Each of the bearing caps 42 further includes a flat end flange portion 44 which is formed integrally with or secured to the body portion 43.

To assemble the universal joint, the yoke lugs 21 of the full round tube yoke 20 are initially oriented perpendicularly with respect to the yoke lugs 31 of the full round end yoke 30. Then, the cross 40 is positioned between the yoke lugs 21 and 31 such that the trunnions 41 extend within the cross holes 22 and 32. When the trunnions 41 are properly aligned with the cross holes 22 and 32, the bearing caps 42 are inserted axially inwardly through the cross holes 22 and 32 over the ends of the trunnions 41. The bearing caps 42 are rotatably mounted on the ends of the each of the trunnions 41 for relative rotation by conventional needle bearings (not shown) or similar means.

Each of the bearing caps 42 is secured to the associated yoke lug 21 or 31 by a pair of self-locking bolts 44*a*. The bolts 44*a* are conventional in the art and have serrations (not shown) formed on the undersides of the heads thereof to prevent them from backing out once they are tightened. Because of these serrations, the bolts 44*a* are designed to be installed only once and not to be re-used after subsequent removal. The structure of the universal joint assembly thus far described is conventional in the art.

As discussed above, the angular relationships between the transmission output shaft 11 and the drive shaft 12 and between the drive shaft 12 and the axle assembly input shaft 13*a* are important factors in the proper operation of the drive train system 10. A conventional inclinometer 45 may be used to determine these angular relationships. In order to determine the slope of the drive shaft 12 relative to the horizontal, the inclinometer 45 is positioned in an abutting relationship against the drive shaft 12. This direct engagement of the drive shaft 12 is easily accomplished because it is usually accessible from beneath the vehicle. The measurement of the slope of the axle assembly input shaft 13*a*, however, is usually not so easily accomplished because it is not easily accessible. However, as mentioned above, each of the flats 33 machined on each of the outer surfaces of the two lugs 31 of the full round end yoke 30 defines a plane which is generally parallel to the longitudinal axis of the axle assembly input shaft 13*a*. Thus, measurement of the slope of the axle assembly input shaft 13*a* can be accomplished from such flats 33.

Figure 4:
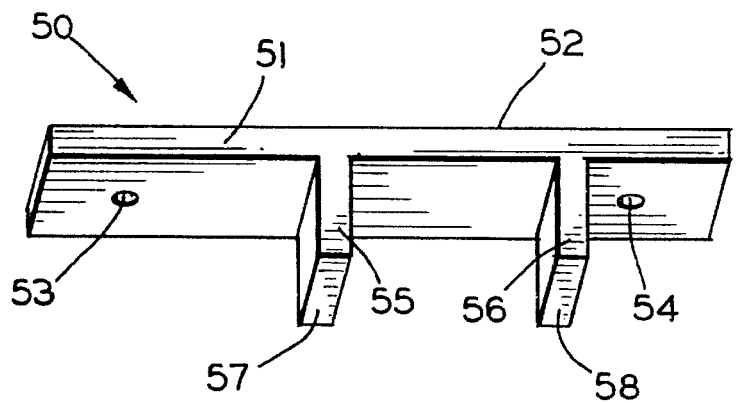
FIG. 4 is a perspective view of the adapter shown in FIG. 3.

To facilitate the measurement of the slope of the plane defined by the flats 33 (and, therefore, the slope of the axle assembly input shaft 13*a*), an adapter, indicated generally at 50, is provided. As shown in FIGS. 3 and 4, the adapter 50 includes a rectangular bracket 51 defining a flat upper surface 52. First and second apertures 53 and 54 are formed through the bracket 51. First and second legs 55 and 56 are formed integrally with or otherwise secured to the bracket 51 and extend outwardly from the side of the bracket 51 opposite of the flat upper surface 52. Preferably, the legs 55 and 56 are of equal length and extend from the bracket 51 at right angles relative to the flat upper surface 52. The legs 55 and 56 are spaced apart from one another by a predetermined distance, which will be described in greater detail below. Each leg 55 and 56 terminates in a flat end surface 57 and 58. Each of the flat end surfaces 57 and 58 is precisely formed to be the same distance from the flat upper surface 52 of the bracket 51 so that they define a plane which is precisely parallel to the flat upper surface 52 of the bracket 51.

In order to secure the inclinometer 45 to the adapter 50, a pair of threaded fasteners 60 are provided. The threaded fasteners 60 extend through the apertures 53 and 54 formed through the bracket 51 and into threaded apertures (not shown) formed in the housing of the inclinometer 45 to secure it thereto. The bracket 51 can be longer than the inclinometer 45 (as shown in FIG. 3) so that it projects beyond each end of the inclinometer 45 to protect the edges thereof. Alternatively, the bracket 51 may be shorter than the inclinometer 45 to allow a second bracket (not shown) to be secured to the side of the inclinometer 51 for making other inclination measurements.

To determine the relative slope of the axle assembly input shaft 13*a*, the inclinometer 45 is attached to the bracket 51 as shown in FIG. 3. Then, the bracket 51 is oriented such that the end surfaces 57 and 58 of the legs 55 and 56 abut the flat 33 machined on the outer surface of the yoke lug 31. The legs 55 and 56 of the bracket 51 are spaced apart from one another by a sufficient distance to prevent the flat end surfaces 57 and 58 from engaging the end flange portion 44 of the bearing cap 42. From this position, an accurate reading of the inclination of the flat surface 33 on the yoke lug 31 can be recorded. As mentioned above, the plane formed by this flat surface 33 is parallel to the axis of the input shaft 13 a so that the recorded inclination is also the slope of the input shaft 13*a*. The difference between this slope measurement and the previous slope measurement of the drive shaft 12 constitutes the angular disposition therebetween.

As shown in FIG. 3, the end yoke 30 is formed having an internally splined sleeve portion to facilitate engagement by an external splined input shaft 13*a* for the axle housing 13. Alternatively, the end yoke 30 may be formed as a combined companion flange and yoke flange assembly including an enlarged circular flange, indicated in dotted lines at 30'. To facilitate the use of the inclinometer 45 with either the end yoke 30 or the enlarged circular flange 30', the legs 55 and 56 are not formed symmetrically on the bracket 51. Rather, as clearly shown in the FIGS. 3 and 4, the legs 55 and 56 are offset from the center toward one side of the bracket 51. This offset orientation facilitates the use of the inclinometer 45 in limited space applications.

The apertures in the bracket 53 and 54 and in the inclinometer (not shown) are centered in the longitudinal axis and positioned the same distance from each end. This symmetrical arrangement allows the inclinometer 45 to be secured to the bracket 51 in a second orientation by rotating the inclinometer with respect to the adapter by one hundred eighty degrees about the vertical axis. This alternate orientation facilitates recording the inclination by allowing the measurements to be taken from the opposite side of the vehicle when access to the yoke lug flats 33 from one side is obstructed.

In accordance with the provisions of the patent statutes, the principle and mode of operation of the present invention have been explained and illustrated in the preferred embodiment, however, it will be understood that the present invention may be practiced otherwise than as specifically explained and illustrated without departing from its spirit or scope.

What is claimed is:

1. A one-piece adapter for use with an inclinometer for measuring the angular inclination of a vehicular drive train component, said adapter comprising:

a rectangularly-shaped bracket having a flat upper surface, a lower surface, and first and second legs extending from said lower surface, said first and second legs terminating in respective flat end surfaces which define a plane which is precisely parallel to said flat upper surface of said bracket, said first and second legs being permanently fixed to said bracket and spaced apart by a predetermined distance adapted to permit said end surfaces to engage the surface of the drive train component; and means for mounting the inclinometer to said upper flat surface of said bracket.

2. The adapter defined in claim 1 wherein said bracket extends between two ends which define a center which is equidistant from said two ends, and said means for mounting the inclinometer includes a pair of apertures formed through said bracket which are located symmetrically relative to said center of said bracket.

3. The adapter defined in claim 1 wherein said bracket extends between two ends which define a center which is equidistant from said two ends, and said first and second legs are provided on said bracket asymmetrically relative to said center of said bracket.

4. The adapter defined in claim 3 wherein said first and second legs extend from the bracket at right angles relative to the flat upper surface.

5. The adapter defined in claim 1 wherein said means for mounting the inclinometer includes a pair of apertures formed through said bracket.

6. The adapter defined in claim 5 wherein said apertures are symmetrically positioned on said flat surface to allow the inclinometer to be mounted to said bracket in a first and second orientation, in said second orientation the inclinometer is rotated 180 degrees about the vertical axis with respect to said first orientation.

7. The adapter defined in claim 1 wherein said bracket extends between two ends which define a center which is equidistant from said two ends, said first and second legs are provided on said bracket asymmetrically relative to said center of said bracket and said means for mounting the inclinometer includes a pair of apertures formed through said bracket which are located symmetrically relative to said center of said bracket.

* * * * *